(12) United States Patent
Dellock et al.

(10) Patent No.: US 9,371,033 B2
(45) Date of Patent: Jun. 21, 2016

(54) VEHICLE SUNSHADE ASSEMBLY

(71) Applicant: Ford Global Technologies, LLC, Dearborn, MI (US)

(72) Inventors: Paul Kenneth Dellock, Northville, MI (US); Stuart C. Salter, White Lake, MI (US); James J. Surman, Clinton Township, MI (US); Cornel Lewis Gardner, Romulus, MI (US); Noah Barlow Mass, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/721,544

(22) Filed: May 26, 2015

(65) Prior Publication Data

US 2015/0251595 A1 Sep. 10, 2015

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.
| | |
|---|---|
| *B60Q 1/00* | (2006.01) |
| *B60Q 1/26* | (2006.01) |
| *B60Q 3/02* | (2006.01) |
| *B60Q 3/00* | (2006.01) |
| *B60J 7/00* | (2006.01) |
| *F21V 9/16* | (2006.01) |
| *H05B 37/02* | (2006.01) |

(52) U.S. Cl.
CPC ............. *B60Q 3/0213* (2013.01); *B60J 7/0007* (2013.01); *B60Q 3/008* (2013.01); *F21V 9/16* (2013.01); *H05B 37/0218* (2013.01); *H05B 37/0227* (2013.01); *B60Q 3/0293* (2013.01); *Y02B 20/46* (2013.01)

(58) Field of Classification Search
CPC ........... B60J 7/00–7/198; B60Q 3/008; B60Q 3/0213; B60Q 3/0293; F21V 9/16; H05B 37/0218; H05B 37/0227
USPC .................................. 362/487–488, 490, 492
See application file for complete search history.

(56) References Cited

U.S. PATENT DOCUMENTS

| | | | |
|---|---|---|---|
| 5,709,453 | A | 1/1998 | Krent et al. |
| 6,475,937 | B1 | 11/2002 | Preisler et al. |
| 6,729,738 | B2 | 5/2004 | Fuwausa et al. |
| 6,773,129 | B2 | 8/2004 | Anderson, Jr. et al. |
| 6,837,460 | B2 | 1/2005 | Guard et al. |
| 6,851,840 | B2 | 2/2005 | Ramamurthy et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP (57) ABSTRACT

A sunshade assembly for a vehicle is provided herein. The sunshade assembly includes a housing and a light-producing assembly coupled to the housing. The housing includes a plurality of light sources and a photoluminescent structure configured to be excited by light emitted from the plurality of light sources such that at least a portion of the housing exhibits a luminescent appearance.

18 Claims, 4 Drawing Sheets

(56) References Cited

U.S. PATENT DOCUMENTS

| | | |
|---|---|---|
| 6,871,986 B2 | 3/2005 | Yamanaka et al. |
| 6,990,922 B2 | 1/2006 | Ichikawa et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| RE42,340 E | 5/2011 | Anderson et al. |
| 7,987,030 B2 | 7/2011 | Flores et al. |
| 8,016,465 B2 | 9/2011 | Egerer et al. |
| 8,071,988 B2 | 12/2011 | Lee et al. |
| 8,203,260 B2 | 6/2012 | Li et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,624,716 B2 | 1/2014 | Englander |
| 8,631,598 B2 | 1/2014 | Li et al. |
| 8,683,722 B1 | 4/2014 | Cowan |
| 8,724,054 B2 | 5/2014 | Jones |
| 8,773,012 B2 | 7/2014 | Ryu et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2005/0189795 A1 | 9/2005 | Roessler |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2008/0079012 A1 | 4/2008 | Grote et al. |
| 2009/0219730 A1 | 9/2009 | Syfert et al. |
| 2009/0251920 A1 | 10/2009 | Kino et al. |
| 2012/0001406 A1 | 1/2012 | Paxton et al. |
| 2012/0280528 A1 | 11/2012 | Dellock et al. |
| 2013/0335994 A1 | 12/2013 | Mulder et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| DE | 102012023932 A | 6/2014 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |
| WO | 2014151689 A2 | 9/2014 |

VEHICLE SUNSHADE ASSEMBLY

CROSS-REFERENCE TO THE RELATED APPLICATIONS

This application is a continuation-in-part of U.S. patent application Ser. No. 14/603,636, filed Jan. 23, 2015, entitled "DOOR ILLUMINATION AND WARNING SYSTEM," which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems and more particularly relates to vehicle lighting systems employing photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a sunshade assembly for a vehicle is provided. The sunshade assembly includes a housing and a light-producing assembly coupled to the housing. The housing includes a plurality of light sources and a photoluminescent structure configured to be excited by light emitted from the plurality of light sources such that at least a portion of the housing exhibits a luminescent appearance.

According to another aspect of the present invention, a sunshade assembly for a vehicle is provided. The sunshade assembly includes a housing and a light-producing assembly disposed inside the housing. The housing includes a plurality of light sources and a photoluminescent structure configured to be excited by light emitted from the plurality of light sources such that at least a portion of the housing exhibits a luminescent appearance.

According to yet another aspect of the present invention, a lighting system of a vehicle is provided. The system includes a first light-producing assembly disposed inside a sunshade. The first light-producing assembly includes a first plurality of light sources and a first photoluminescent structure configured to be excited by light emitted from the first plurality of light sources such that at least a portion of the sunshade exhibits a luminescent appearance. The system also includes a second light light-producing assembly coupled to a window coverable by the sunshade. The second light-producing assembly includes a second plurality of light sources and a second photoluminescent structure configured to be excited by light emitted from the second plurality of light sources such that at least a portion of the window exhibits a luminescent appearance.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure is related to a sunshade assembly for use in a vehicle. The sunshade assembly is operable to provide interior vehicle lighting. While the sunshade assembly is contemplated for use in automobiles, it should be appreciated that the sunshade assembly disclosed herein may be similarly adapted for use in other types of vehicles designed to transport one or more passengers such as, but not limited to, aircraft, watercraft, and locomotives.

Figure 1:
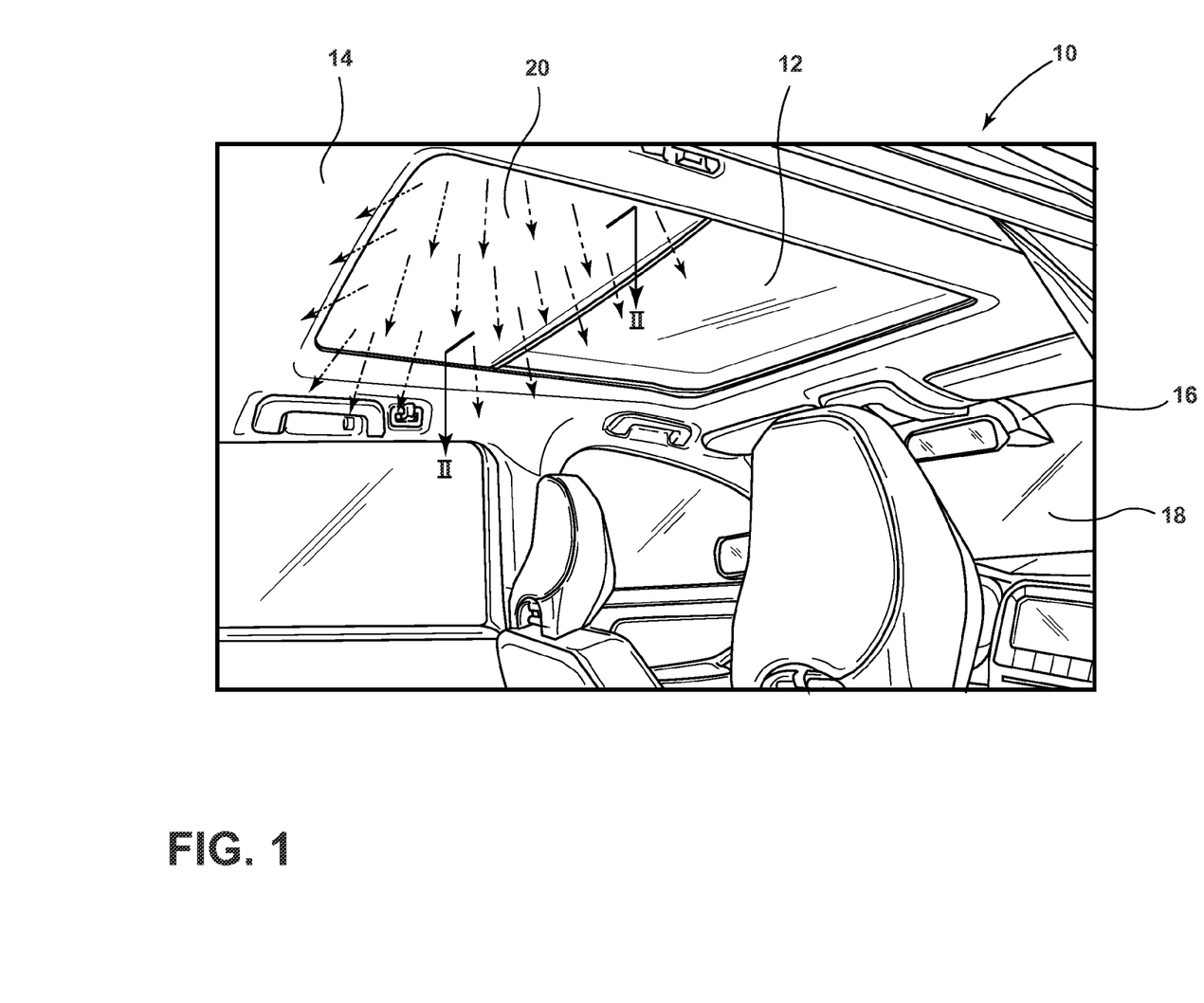
FIG. 1 illustrates a vehicle having a sunshade that is operable to illuminate according to one embodiment.

Referring to FIG. 1, a vehicle 10 is generally shown having a window 12 located in a roof structure 14. The window 12 may be configured as a panoramic sunroof or moonroof having one or more glass panels. When uncovered, the window 12 allows natural light to fill the vehicle cabin during the day. At night, the window 12 may be used for star and moon gazing. In some embodiments, the window 12 may be opened via a sliding or tilting action to allow air to enter the vehicle 10. The controls for opening and closing the window 12 may be located in a rear view mirror assembly 16 next to a front windshield 18 or other location. In some instances, the window 12 may be fully or partially covered by a sunshade 20 that is housed in the roof the structure 14 and is movable between a stored position and a use position. In the stored position, the sunshade 20 is housed in the roof structure 14 such that the window 12 is fully uncovered whereas in the use position, the sunshade 20 is positioned to fully or partially cover the window 12 to block out light or offer greater seclusion. The controls for moving the sunshade 20 between the stored and use positions may also be located in the rear mirror assembly 16. In embodiments having multiple glass panels, it is to be understood that each glass panel may have its own sunshade or share a common sunshade. In instances where the sunshade 20 is positioned to fully or partially cover the window 12, at least a portion of the sunshade 20 may illuminate to provide interior illumination as demonstrated by the lines extending downwardly from the sunshade 20. In such an arrangement, the sunshade 20 may substitute for a conventional dome lighting assembly, which is typically unavailable in vehicles having panoramic sunroofs or moonroofs due to the window 12 occupying a large portion of the roofline.

Figure 2:
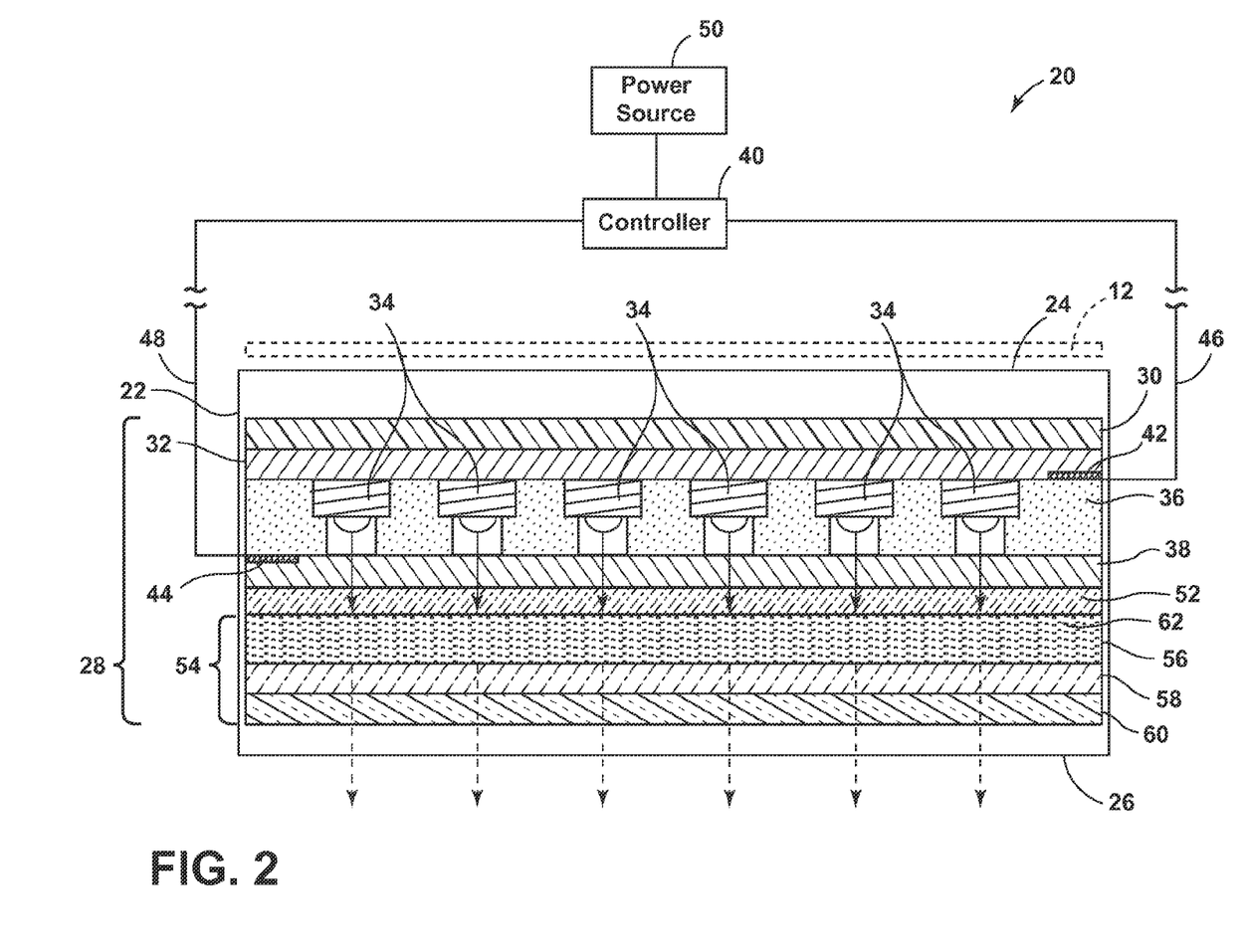
FIG. 2 is a cross-sectional view of a sunshade taken along lines II-II of FIG. 1, according to one embodiment.

Referring to FIG. 2, a cross-sectional view of the sunshade 20 depicted in FIG. 1 is shown according to one embodiment and is shown located below a corresponding portion of the window 12. According to the illustrated embodiment, the sunshade 20 includes a housing 22 having a first side 24 and a second side 26. The first side 24 includes a top of the housing 22 and is disposed proximate to the window 12. The second side 26 includes a bottom of the housing 22 and is disposed distal to the window 12. A light-producing assembly 28 is disposed inside the housing 22 between the first and second sides 24, 26. In operation, the light-producing assembly 28 produces illumination directed downward toward the second side 26 of the housing 22. In such an arrangement, the first side 24 of the housing 22 may include a fabric or other material that is substantially light blocking to shield the light-producing assembly 28 from sunlight entering via the window 12 when the sunshade 20 is in use. In contrast, the second side 26 of the housing 22 may include a fabric or other material that is substantially light permeable to allow illumination produced by the light-producing assembly 28 to be outputted therethrough into the vehicle cabin.

The light-producing assembly 28 includes a substrate 30 arranged below the first side 24. The substrate 30 may include a polycarbonate, poly-methyl methacrylate (PMMA), or polyethylene terephthalate (PET) material on the order of 0.005 to 0.060 inches thick. A positive electrode 32 is arranged below the substrate 30 and includes a conductive epoxy such as, but not limited to, a silver-containing or copper-containing epoxy. The positive electrode 32 is electrically connected to a plurality of light sources such as LEDs 34, which are arranged within a semiconductor ink 36 and applied to the underside of the positive electrode 32. A negative electrode 38 is also electrically connected to the LEDs 34. The negative electrode 38 is arranged below the semiconductor ink 36 and includes a transparent or translucent conductive material such as, but not limited to, indium tin oxide. In alternative embodiments, the positive and negative electrodes 32, 38 may trade places, if desired, in which case the positive electrode 32 should include a transparent or translucent conductive material to allow light emitted from the LEDs 34 to be transmitted therethrough.

Each of the positive and negative electrodes 32, 38 are electrically connected to a controller 40 via a corresponding bus bar 42, 44 and a corresponding conductive lead 46, 48. The bus bars 42, 44 may be printed along opposite edges of the positive and negative electrodes 32, 38 and the points of connection between the bus bars 42, 44 and the conductive leads 46, 48 may be at opposite corners of each bus bar 42, 44 to promote uniform current distribution along the bus bars 42, 44. The conductive leads 46, 48 may be wired through the roof structure 14 of the vehicle 10 to the controller 40, which may be variously located in the vehicle 10 and may also be electrically connected to a power source 50. In one embodiment, the power source 50 may correspond to a vehicular power source operating at 12 to 16 VDC.

The LEDs 34 may be dispersed in a random or controlled fashion within the semiconductor ink 36 and are disposed facing the vehicle cabin and may be configured to emit focused or non-focused light. The LEDs 34 may correspond to micro-LEDs of gallium nitride elements on the order of 5 to 400 microns in size and the semiconductor ink 36 may include various binders and dielectric material including, but not limited to, one or more of gallium, indium, silicon carbide, phosphorous, and/or translucent polymeric binders. In this manner, the semiconductor ink 36 may contain various concentrations of LEDs 34 such that the density of the LEDs 34 may be adjusted for various lighting applications. In some embodiments, the LEDs 34 and semiconductor ink 36 may be sourced from Nth Degree Technologies Worldwide Inc. The semiconductor ink 36 can be applied through various printing processes, including ink jet and silk screen processes to selected portion(s) of the positive electrode 32. More specifically, it is envisioned that the LEDs 34 are dispersed within the semiconductor ink 36, and shaped and sized such that a substantial quantity of them align with the positive and negative electrodes 32, 38 during deposition of the semiconductor ink 36. The portion of the LEDs 34 that ultimately are electrically connected to the positive and negative electrodes 32, 38 may be selectively activated and deactivated by the controller 40. An optional diffusing layer 52 may be arranged below the negative electrode 38 to diffuse light emitted from the LEDs 34.

Referring still to FIG. 2, the light-producing assembly 28 further includes at least one photoluminescent structure 54 arranged below the diffusing layer 52 or the negative electrode 38 in the absence of the diffusing layer 52. The photoluminescent structure 54 may be arranged as a coating, layer, film or other suitable deposition. With respect to the presently illustrated embodiment, the photoluminescent structure 54 may be arranged as a multi-layered structure including an energy conversion layer 56 and an optional stability layer 58 and optional protection layer 60. The energy conversion layer 56 includes at least one photoluminescent material 62 having energy converting elements with phosphorescent or fluorescent properties. For example, the photoluminescent material 62 may include organic or inorganic fluorescent dyes including rylenes, xanthenes, porphyrins, phthalocyanines. Additionally or alternatively, the photoluminescent material 62 may include phosphors from the group of Ce-doped garnets such as YAG:Ce. The energy conversion layer 56 may be prepared by dispersing the photoluminescent material 62 in a polymer matrix to form a homogenous mixture using a variety of methods. Such methods may include preparing the energy conversion layer 56 from a formulation in a liquid carrier medium and coating the energy conversion layer 56 to the diffusing layer 52 or the negative electrode 38. The energy conversion layer 56 may be applied to the diffusing layer 52 or the negative electrode 38 by painting, screen printing, flexography, spraying, slot coating, dip coating, roller coating, and bar coating. Alternatively, the energy conversion layer 56 may be prepared by methods that do not use a liquid carrier medium. For example, the energy conversion layer 56 may be rendered by dispersing the photoluminescent material 62 into a solid state solution (homogenous mixture in a dry state) that may be incorporated in a polymer matrix formed by extrusion, injection, compression, calendaring, thermoforming, etc.

To protect the photoluminescent material 62 contained within the energy conversion layer 56 from photolytic and thermal degradation, the photoluminescent structure 54 may optionally include stability layer 58. The stability layer 58 may be configured as a separate layer optically coupled and adhered to the energy conversion layer 56 or otherwise integrated therewith. The photoluminescent structure 54 may also optionally include protection layer 60 optically coupled and adhered to the stability layer 58 or other layer to protect the photoluminescent structure 28 along with other components of the light-producing assembly 28 from physical and chemical damage arising from environmental exposure. The stability layer 58 and/or the protection layer 60 may be combined with the energy conversion layer 56 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference. Also, additional information regarding the construction of light-producing assemblies is disclosed in U.S. Patent Publication No. 2014-0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

In operation, the photoluminescent structure 54 is configured to luminesce in response to excitation by light emitted by the LEDs 34. More specifically, light emitted from the LEDs 34 undergoes an energy conversion process and is converted by the photoluminescent material 62 and re-emitted therefrom at a different wavelength. The re-emitted light is outputted from the housing 22 of the sunshade 20 via the second side 26, which causes it to exhibit a luminescent appearance. Light emitted by the LEDs 34 is referred to herein as inputted light, whereas light re-emitted from the photoluminescent material 62 is referred to herein as converted light. According to one embodiment, the photoluminescent material 62 may be formulated to convert inputted light into a longer wavelength light, otherwise known as down conversion. Alternatively, the photoluminescent material 62 may be formulated to convert inputted light into a shorter wavelength light, otherwise known as up conversion. Under either approach, light converted by the photoluminescent material 62 may be subsequently outputted from the photoluminescent structure 54 or otherwise used in an energy cascade, wherein the converted light serves as inputted light to excite another formulation of photoluminescent material located within the energy conversion layer 56, whereby the subsequent converted light may then be outputted from the photoluminescent structure 54 or used as inputted light, and so on. With respect to the energy conversion processes described herein, the difference in wavelength between the inputted light and the converted light is known as the Stokes shift and serves as the principle driving mechanism for an energy conversion process corresponding to a change in wavelength of light.

According to one embodiment, the photoluminescent material 62 is formulated to have a Stokes shift resulting in the converted light having an emission spectrum expressed in a desired color. In one embodiment, the energy conversion process may be undertaken by way of down conversion, whereby the inputted light includes light on the lower end of the visibility spectrum such as blue, violet, or ultraviolet (UV) light. Doing so enables blue, violet, or UV LEDs to be used as the LEDs 34, which may offer a relative cost advantage over other colors of LEDs or simply using LEDs of the desired color and omitting the photoluminescent structure 54 altogether.

In alternative embodiments, the energy conversion layer 56 may include more than one distinct photoluminescent material, each of which is configured to convert inputted light into a longer or shorter wavelength light. In one embodiment, the distinct photoluminescent materials may be interspersed within the energy conversion layer 56. Alternatively, the distinct photoluminescent materials may be isolated from each other if desired. For example, the distinct photoluminescent materials may be arranged to alternate in a tessellation or other pattern. In either embodiment, each distinct photoluminescent material may be uniquely excited by a corresponding portion of the LEDs 34, which may be variously arranged. In some embodiments, each distinct photoluminescent material may be formulated to have a Stokes shift resulting in the associated converted light having an emission spectrum expressed in a unique color such that the resultant luminescence corresponds to a light mixture of the converted light from each distinct photoluminescent material. By mixing the converted light outputted from two or more distinct photoluminescent materials, a greater diversity of colors may be expressed that might otherwise be unachievable through the excitation of a single photoluminescent material. Contemplated colors include light mixtures containing any combination of red, green, and blue light, all of which may be achieved by selecting the appropriate combinations of photoluminescent materials and LEDs. Additional information on the arrangements of distinct photoluminescent materials and corresponding LEDs is disclosed in U.S. patent application Ser. No. 14/697,035 to Salter et al., entitled "LIGHT-PRODUCING ASSEMBLY FOR A VEHICLE," filed Apr. 27, 2015, the entire disclosure of which are incorporated herein by reference.

In operation, the controller 40 may selectively control the intensity of the LEDs 34 to ultimately affect the brightness of the luminescent light outputted from the sunshade 20. For example, increasing the intensity of the LEDs 34 generally results in a brighter luminescence. The controller 40 may control the intensity of the LEDs 34 through pulse-width modulation or direct current control. Additionally or alternatively, the controller 40 may control the light emission duration of the LEDs 34 to affect the duration in which the sunshade 20 luminesces. For example, the controller 40 may activate the LEDs 34 for an extended duration such that the sunshade 20 exhibits sustained luminescence. Alternatively, the controller 40 may flash the LEDs 34 at varying time intervals such that the sunshade exhibits a blinking effect.

Figure 3:
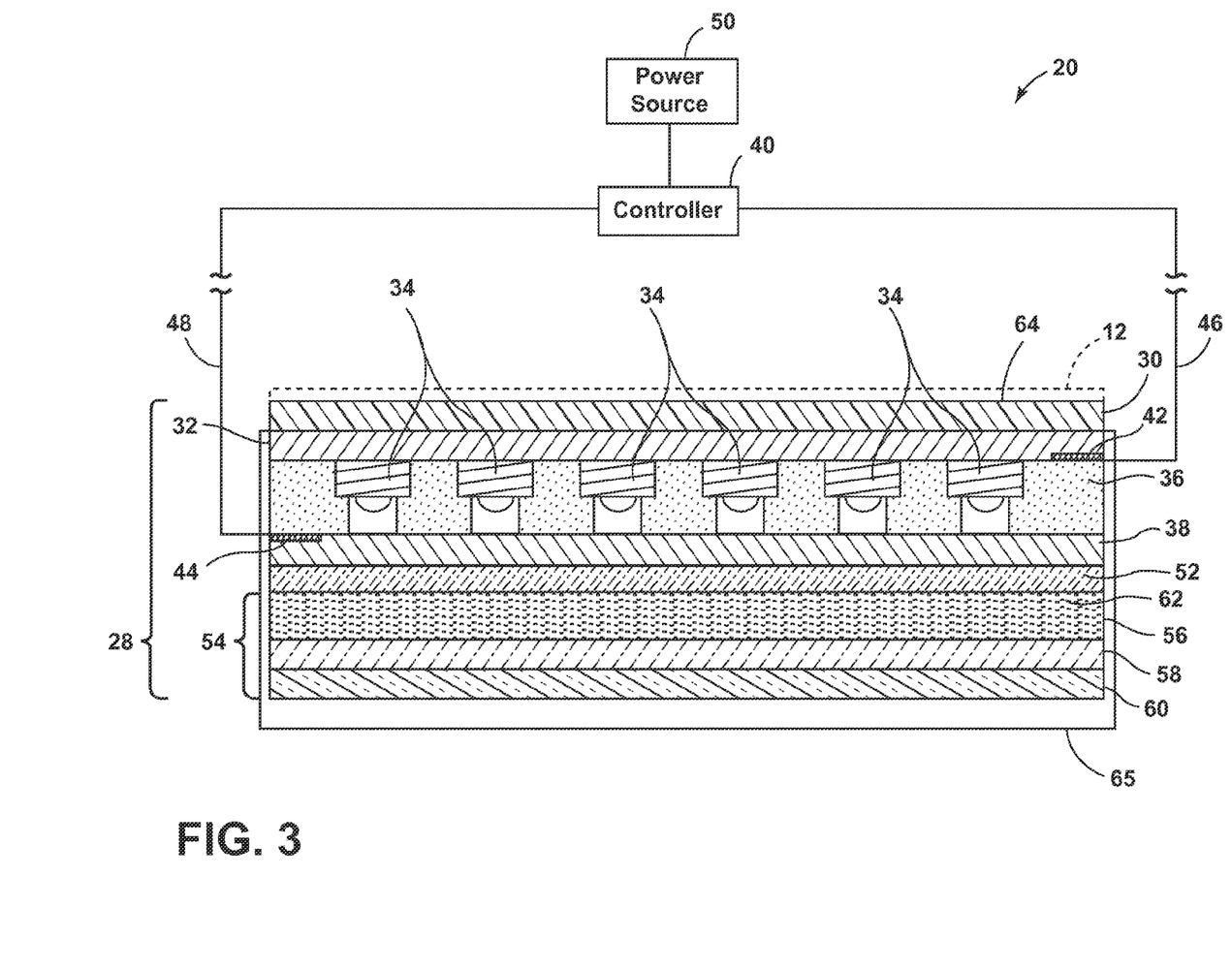
FIG. 3 is illustrates a light-producing assembly coupled to a window that is coverable by a sunshade, according to one embodiment.

Referring to FIG. 3, a light-producing assembly 28 may additionally or alternatively be coupled to the window 12 for providing interior lighting in instances where the sunshade 20 is in the stored position or only partially covering the window 12. The light-producing assembly 28 may be coupled to an underside portion 64 of the window 12 using an optically clear adhesive. The light-producing assembly 28 may be arranged and operated similarly to the one described previously with reference to FIG. 2 with the exception that the positive electrode 32 includes a transparent or translucent conductive material such as indium tin oxide to preserve visibility through the window 12. Likewise, the substrate 30 should also impart transparent or translucent qualities. Additionally, a substantially transparent protective over-mold 65 may be disposed to cover the light-producing assembly 28.

Visibility through the window 12 may also be controlled based on the density of the LEDs 34 within the semiconductor ink 36. For example, a low density of LEDs 34 will generally interfere less with visibility through the window 12 at the cost of providing less excitement of the photoluminescent structure 54, thereby resulting in a lower degree of luminescence. In contrast, a high density of LEDs 34 will generally increase the luminescence of the photoluminescent structure 54 at the cost of a reduction in visibility through the window 12. Thus, a variety of interior lighting applications can be had by selecting different densities of LEDs 34. According to one embodiment, a low density of LEDs 34 is dispersed at random and operated to excite the photoluminescent structure 54 to produce a starlight pattern. In alternative embodiments, the photoluminescent structure 54 may be omitted from the light-producing assembly 28 in favor of using the LEDs 34 directly for interior illumination. For example, the LEDs 34 may correspond to white LEDs dispersed in low or high density arrangements. However, as will be described below, omitting the photoluminescent structure 54 may result in an increase to cost.

Figure 4:
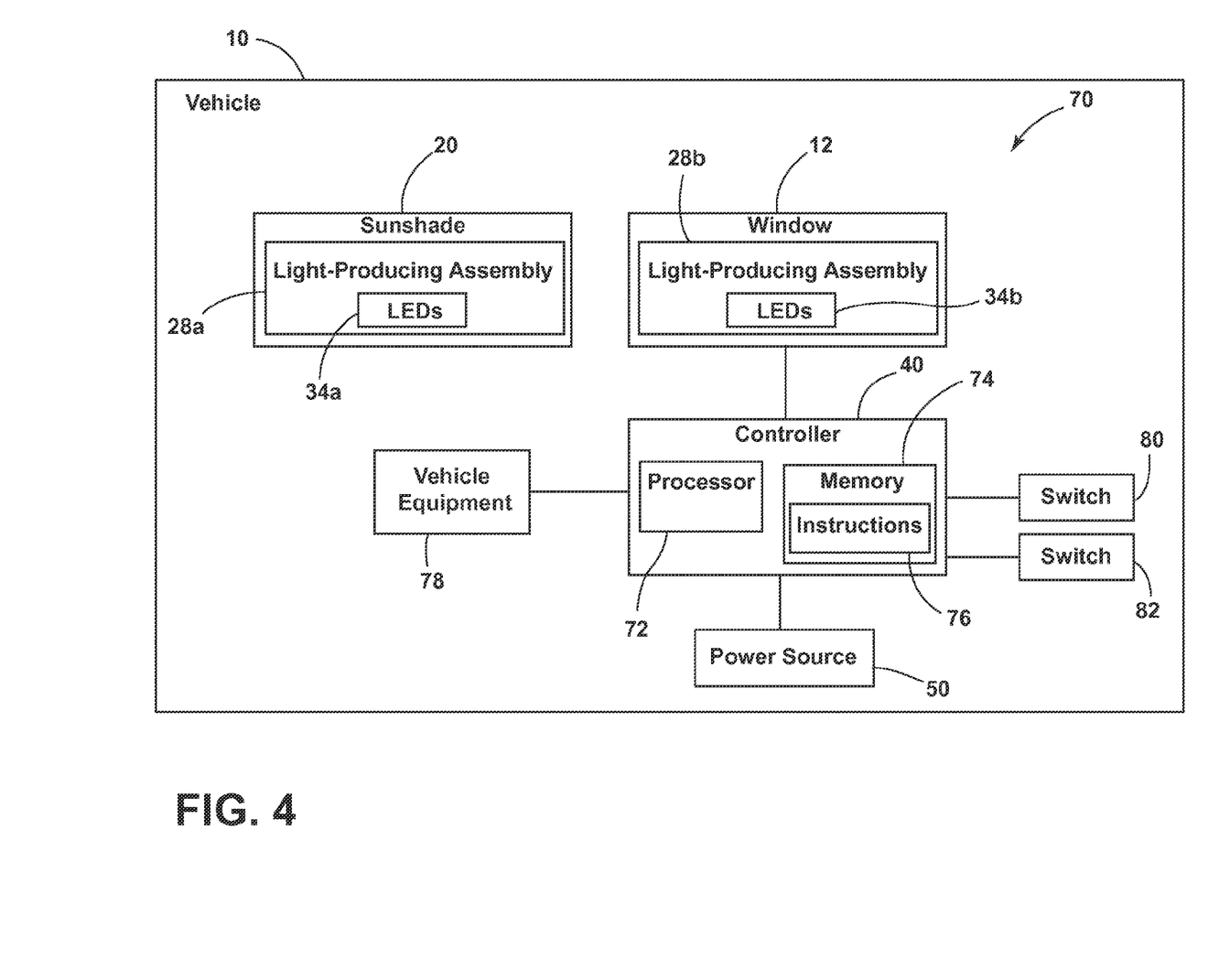
FIG. 4 is a block diagram of a lighting system that includes a first light-producing assembly disposed inside a sunshade and a second light-producing assembly coupled to a window that is coverable by the sunshade, according to one embodiment.

Referring to FIG. 4, a block diagram of a lighting system 70 for use in a vehicle 10 is shown according to one embodiment. The system 70 includes light-producing assemblies 28a and 28b, both of which are electrically coupled to a controller 40. Light-producing assembly 28a is part of a sunshade 20 and may be arranged according to the light-producing assembly 28 depicted in FIG. 2. Light-producing assembly 28b is coupled to at least a portion of a window 12 and may correspond to the light-producing assembly 28 depicted in FIG. 3. Light-producing assemblies 28a and 28b are electrically connected to a controller 40, which is electrically connected to a power source 50. In one embodiment, the power source 50 may correspond to a vehicular power source operating at 12 to 16 VDC. The controller 40 may be variously located within the vehicle 10 and includes a processor 72 in communication with a memory 74. The memory 74 includes instructions 76 stored thereon that are executable by the processor 72.

The controller 40 may be communicatively coupled to one or more vehicle equipment 78 and use signals received therefrom to control the corresponding LEDs 34a, 34b of light-producing assemblies 28a and 28b, which determines the resultant luminescent appearance exhibited by the sunshade 20 and window 12, respectively. The controller 40 may communicate with the one or more vehicle equipment 78 and may receive signals therefrom directed to a vehicle-related condition such as, but not limited to, an operational state of the vehicle, a status related to a particular vehicle equipment (e.g., door open status), a key fob proximity status, a remote signal sourced from a portable electronic device, a status related to an operating environment of the vehicle (e.g., an ambient light level), or any other information or control signal that may be utilized to activate or otherwise adjust the output of the light-producing assembly 28. Further, the controller 40 may be communicatively coupled to one or more switches, shown as switches 80 and 82. Switch 80 may be operably coupled to light-producing assembly 28a and switch 82 may be operably coupled to light-producing assembly 28b. Switches 80 and 82 may each be configured to allow a user to control the corresponding LEDs 34 of light-producing assemblies 28a and 28b. According to one embodiment, switches 80 and 82 are capacitive switches, thereby allowing a user to control the corresponding LEDs 34 of light-producing assemblies 28a and 28b based on at least one touch event. Switches 80 and 82 may be located on the sunshade 20 and window 12, respectively, or elsewhere located in the vehicle 10.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A sunshade assembly for a vehicle, comprising:
    a housing for the sunshade assembly;
    a light-producing assembly coupled to the housing and comprising:
        a plurality of light sources; and
        a photoluminescent structure configured to be excited by light emitted from the plurality of light sources such that at least a portion of the housing exhibits a luminescent appearance;
    wherein the housing is movable relative a window and comprises a first side disposed proximate to the window and a second side disposed distal to the window, wherein the first side is substantially light blocking and the second side is substantially light permeable.

2. The sunshade assembly of claim 1, wherein the light-producing assembly is disposed between the first and second sides of the housing and is oriented such that the photoluminescent structure of the light-producing assembly is proximate to the second side of the housing.

3. The sunshade assembly of claim 1, wherein the plurality of light sources are dispersed in a printed LED arrangement.

4. The sunshade assembly of claim 1, wherein each of the plurality of light sources comprise one of an ultraviolet, a violet, and a blue LED source.

5. The sunshade assembly of claim 1, further comprising a controller for selectively activating the plurality of light sources based on at least one vehicle-related condition.

6. The sunshade assembly of claim 1, further comprising a switch for selectively activating the plurality of light sources based on at least one touch event.

7. A sunshade assembly for a vehicle, comprising:
    a housing for the sunshade assembly;
    a light-producing assembly disposed inside the housing and comprising:
        a plurality of light sources, wherein the plurality of light sources are dispersed in a printed LED arrangement; and
        a photoluminescent structure configured to be excited by light emitted from the plurality of light sources such that at least a portion of the housing exhibits a luminescent appearance.

8. The sunshade assembly of claim 7, wherein the housing is movable relative a window and comprises a first side disposed proximate to the window and a second side disposed distal to the window, wherein the first side is substantially light blocking and the second side is substantially light permeable.

9. The sunshade assembly of claim 8, wherein the light-producing assembly is disposed between the first and second sides of the housing and is oriented such that the photoluminescent structure of the light-producing assembly is proximate to the second side of the housing.

10. The sunshade assembly of claim 7, wherein each of the plurality of light sources comprise one of an ultraviolet, a violet, and a blue LED source.

11. The sunshade assembly of claim 7, further comprising a controller for selectively activating the plurality of light sources based on at least one vehicle-related condition.

12. The sunshade assembly of claim 7, further comprising a switch for selectively activating the plurality of light sources based on at least one touch event.

13. A lighting system of a vehicle, comprising:
- a first light-producing assembly disposed inside a sunshade and comprising:
  - a first plurality of light sources; and
  - a first photoluminescent structure configured to be excited by light emitted from the first plurality of light sources such that at least a portion of the sunshade exhibits a luminescent appearance; and
- a second light-producing assembly coupled to a window coverable by the sunshade and comprising:
  - a second plurality of light sources; and
  - a second photoluminescent structure configured to be excited by light emitted from the second plurality of light sources such that at least a portion of the window exhibits a luminescent appearance.

14. The lighting system of claim 13, wherein the sunshade and the window are located on a roof structure of the vehicle and the window is configured as one of a moonroof and a sunroof.

15. The lighting system of claim 13, wherein the first and second plurality of light sources are dispersed in a printed LED arrangement.

16. The lighting system of claim 13, wherein each of the first and second plurality of light sources comprise one of an ultraviolet, a violet, and a blue LED source.

17. The lighting system of claim 13, further comprising a controller for selectively activating at least one of the first and second plurality of light sources based on at least one vehicle-related condition.

18. The lighting system of claim 13, further comprising a switch for selectively activating at least one of the first and second plurality of light sources based on at least one touch event.

* * * * *